(12) United States Patent
Snyder et al.

(10) Patent No.: US 8,254,212 B2
(45) Date of Patent: Aug. 28, 2012

(54) INTEGRATED HEAT ASSISTED MAGNETIC RECORDING DEVICE

(75) Inventors: Tanya Jegeris Snyder, Edina, MN (US); David Allen Sluzewski, Eagan, MN (US); Scott Eugene Olson, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 412 days.

(21) Appl. No.: 12/491,914

(22) Filed: Jun. 25, 2009

(65) Prior Publication Data

US 2010/0328807 A1 Dec. 30, 2010

(51) Int. Cl.
*G11B 11/00* (2006.01)

(52) U.S. Cl. .................................. 369/13.33; 369/13.13

(58) Field of Classification Search ............... 369/13.33, 369/13.13, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 6,275,453 B1 * | 8/2001 | Ueyanagi et al. | 369/44.14 |
| 6,320,708 B1 * | 11/2001 | Ueyanagi et al. | 359/824 |
| 6,396,776 B1 * | 5/2002 | Ueyanagi | 369/13.33 |
| 6,795,630 B2 | 9/2004 | Challener et al. | |
| 6,944,112 B2 | 9/2005 | Challener | |
| 7,006,336 B2 | 2/2006 | Coffey et al. | |
| 7,155,732 B2 | 12/2006 | Rausch et al. | |
| 7,266,268 B2 | 9/2007 | Challener et al. | |
| 7,268,973 B2 | 9/2007 | Lille et al. | |
| 7,272,079 B2 | 9/2007 | Challener | |
| 7,345,840 B2 | 3/2008 | Gomez et al. | |
| 7,372,648 B2 | 5/2008 | Akiyama et al. | |
| 7,412,143 B2 | 8/2008 | Rottmayer et al. | |
| 2001/0009541 A1 * | 7/2001 | Ueyanagi | 369/112.23 |
| 2006/0187564 A1 * | 8/2006 | Sato et al. | 360/59 |
| 2006/0256694 A1 | 11/2006 | Chu et al. | |
| 2007/0153417 A1 | 7/2007 | Suh et al. | |

(Continued)

FOREIGN PATENT DOCUMENTS

WO 2008010944 1/2008

OTHER PUBLICATIONS

William A. Challener, Terry W. McDaniel, Christophe D. Mihalcea, Keith R. Mountfield, Kalman Pelhos and Ibrahim K. Sendur; Light Delivery Techniques for Heat-Assisted Magnetic Recording,Jpn. J. Appl. Phys. vol. 42 (2003) pp. 981-988, Part 1, No. 2B, Feb. 2003.

*Primary Examiner* — Tan X Dinh
(74) *Attorney, Agent, or Firm* — Hollingsworth Davis, LLC

(57) ABSTRACT

An integrated heat-assisted magnetic recording (HAMR) device comprises a slider that has a top surface, a bottom surface, and a trailing end. A waveguide is carried on the trailing end and a near field transducer is positioned to receive energy from the waveguide and produce plasmons for heating a region of a magnetic medium. A write pole is carried by the slider adjacent to the near field transducer. A laser is mounted on the top surface of the slider and produces a laser beam that passes through a beam shaper mounted on the top surface of the slider that collimates or focuses the laser beam. A mirror is mounted on the slider for directing the collimated or focused light beam into the waveguide.

17 Claims, 11 Drawing Sheets

U.S. PATENT DOCUMENTS

| | | | |
|---|---|---|---|
| 2007/0242921 A1* | 10/2007 | Matsumoto | 385/33 |
| 2008/0013912 A1 | 1/2008 | Shukh et al. | |
| 2008/0056073 A1* | 3/2008 | Shimizu | 369/13.02 |
| 2008/0181560 A1 | 7/2008 | Suh et al. | |
| 2009/0074358 A1* | 3/2009 | Itagi et al. | 385/37 |
| 2009/0262608 A1* | 10/2009 | Kurita et al. | 369/13.33 |
| 2011/0122735 A1* | 5/2011 | Kato et al. | 369/13.14 |
| 2011/0164334 A1* | 7/2011 | Jin et al. | 360/59 |

* cited by examiner

INTEGRATED HEAT ASSISTED MAGNETIC RECORDING DEVICE

BACKGROUND

In response to increased demand for higher magnetic storage capacity, areal bit densities approaching 1 TB/in² are being contemplated. The bit size of sub-50 nm required to fulfill this goal is within a range where superparamagnetic instabilities affect the life time of stored data. Superparamagnetic instabilities become an issue as the grain volume of the recording media is reduced in order to maintain the number of grains per bit. The superparamagnetic effect is most evident when the grain volume V is sufficiently small that the inequality $K_u V/k_B T > 70$ can no longer be maintained. $K_u$ is the magnetocrystalline anisotropy energy density of the material, $k_B$ is Boltzmann's constant, and T is absolute temperature. When this inequality is not satisfied, thermal energy can demagnetize the stored bits. As the grain size is decreased in order to increase the areal density, a threshold is reached for a given $K_u$ and temperature T such that stable data storage is no longer feasible.

The thermal stability can be improved by employing a recording medium formed of a material with a very high $K_u$. However, with available materials, recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic field to write to the medium in order to assist in the recording process.

Heat assisted magnetic recording (HAMR) generally refers to the concept of locally heating a recording medium to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

For heat assisted magnetic recording, an electromagnetic wave of, for example, visible, infrared, or ultraviolet light can be directed onto a surface of a data storage medium to raise the temperature of a localized area to facilitate switching. Well known optical waveguides such as solid immersion lenses (SILs), solid immersion mirrors (SIMs), and mode index lenses have been proposed for use in reducing the size of a spot on the medium that is subjected to the electromagnetic radiation. SILs, SIMs, and mode index lenses alone are not sufficient to achieve focal spot sizes necessary for high areal density recording due to diffraction limited optical effects. Metal pins and other near field transducer (NFT) designs positioned at the focal point of the waveguide are used to further concentrate the energy and direct it to a small spot on the surface of the recording medium.

Because it has been known that a close proximity of the near field optical transducer and writing field is necessary, many techniques to deliver the electromagnetic wave from the energy source to the recording medium in an efficient way have been proposed. Some proposals have the energy source directed right at the waveguide, but the energy source is set some appreciable distance away. Another light delivery technique that has been proposed uses optical fibers as waveguides. But, optical fibers are very stiff and can affect the flyability of a slider in a disc drive system. The use of microelectromechanical systems (MEMS) mirrors has also been proposed for light delivery. The time and cost it takes to make and integrate those components into a HAMR system makes that proposed solution impractical.

There is a need for a compact, modular HAMR recording device that can provide localized heating without costly components or difficult interconnects.

SUMMARY

An integrated heat-assisted magnetic recording (HAMR) device comprises a slider which carries a laser, a beam shaper, a mirror, a write pole, a waveguide, and a near field transducer. The laser is mounted on a top surface of the slider and emits a light beam. The beam shaper is attached to the slider such that the light beam from the laser is collimated or focused. The mirror is attached to the slider such that the mirror directs the collimated or focused light beam into a waveguide mounted on the slider. A near field transducer is positioned adjacent to the write pole and receives energy from the waveguide and produces plasmons for heating a region of a magnetic medium.

Another aspect provides a method for creating integrated heat-assisted magnetic recording devices. A row of lasers are mounted to a slider bar, and a row of covers are bonded to the slider bar. The slider bar is lapped to a set of required dimensions. A plurality of ball pads and a plurality of electrical leads are patterned on a top surface of the row of covers. A plurality of electrical connections are made between the row of covers and the slider bar. The slider bar and row of covers are diced into a plurality of individual parts. A plurality of mirrors are aligned to the plurality of individual parts, and the plurality of individual parts are attached to a plurality of head gimbal assemblies.

DETAILED DESCRIPTION

Figure 1:
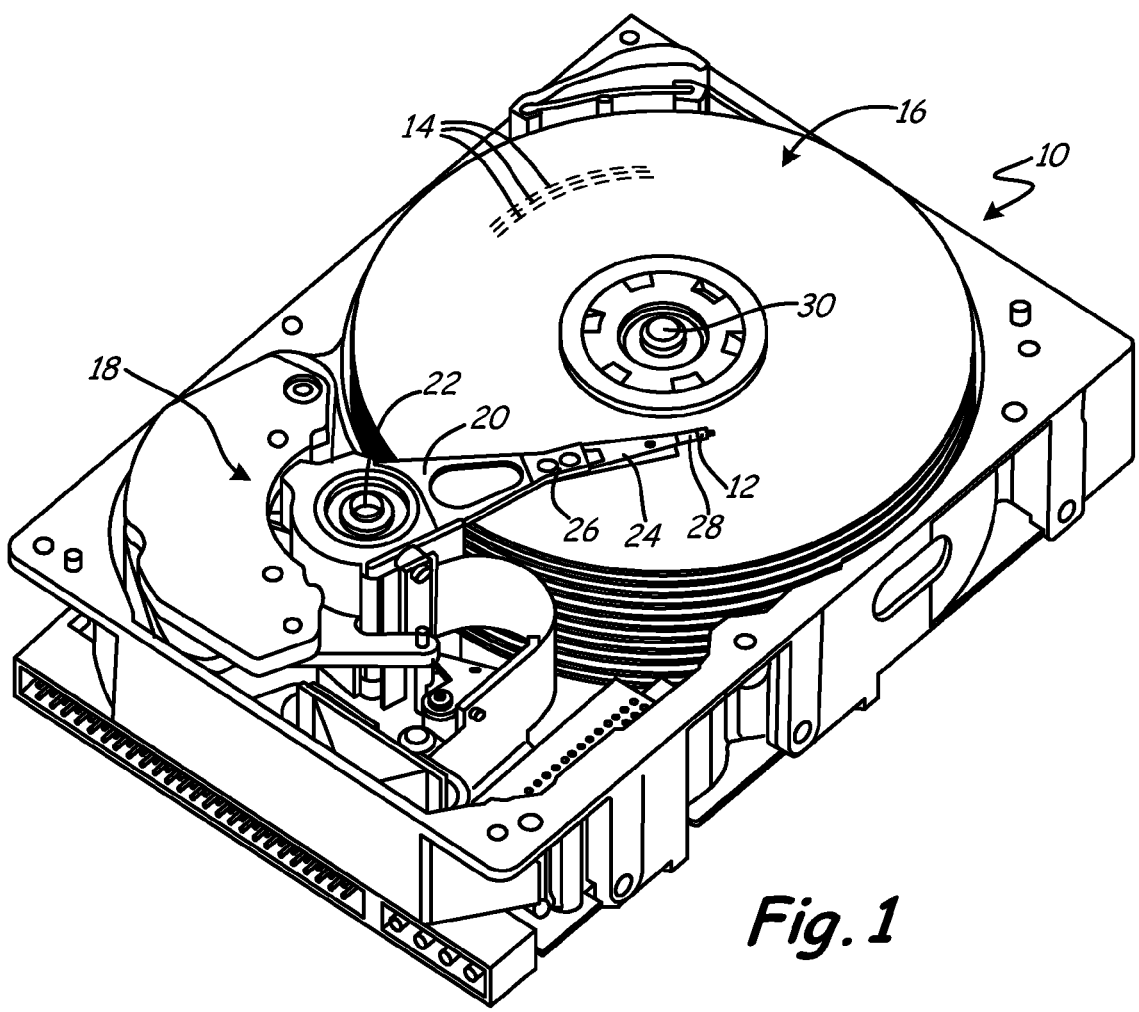
FIG. 1 is a perspective view of a disc drive including a suspension arm and slider.

FIG. 1 is a perspective view of disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes voice coil motor (VCM) 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Heat assisted magnetic recording (HAMR) relies on an energy source such as a laser to locally heat the surface of storage medium 16. The present invention utilizes a special recording head assembly on the end of suspension 28 and in conjunction with slider 12 to provide the localized heating. Specifically, the invention integrates many of the necessary HAMR components into and around slider 12.

Figure 2:
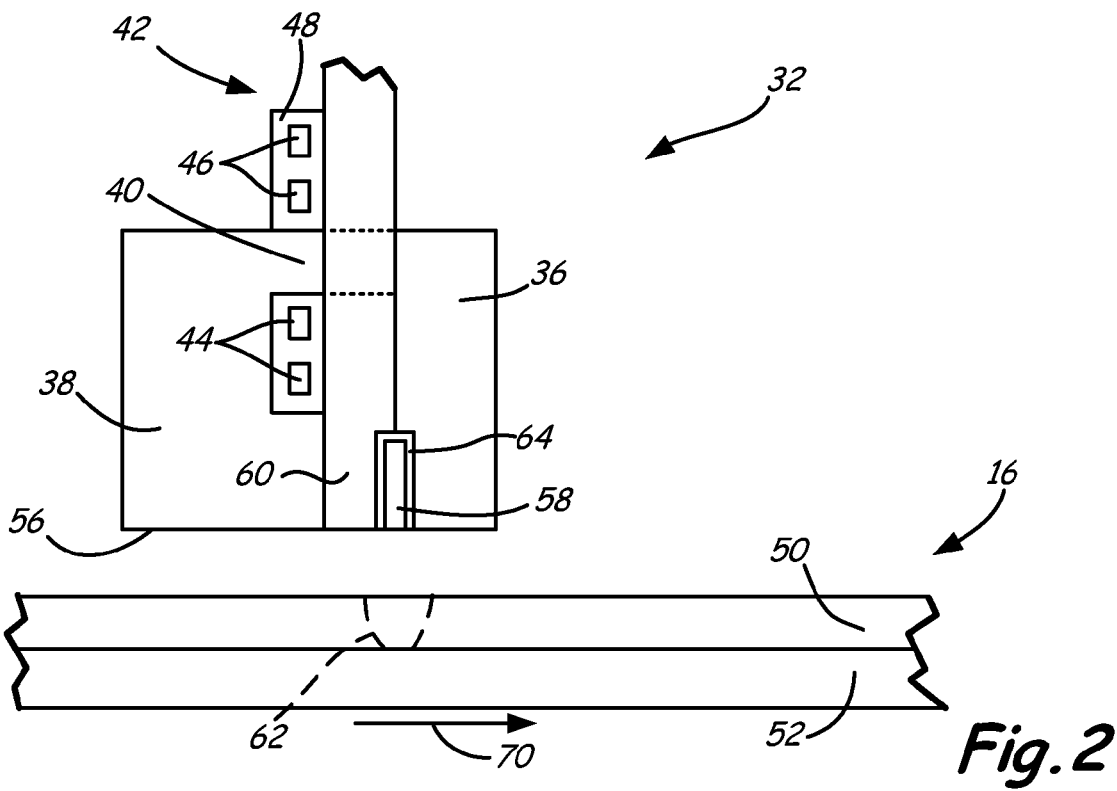
FIG. 2 is a cross sectional view of a perpendicular magnetic recording head and of an associated recording medium.

Before a more detailed description of the invention is given, a brief overview of how HAMR functions will be given. FIG. 2 shows a cross sectional schematic view of a portion of magnetic writer 32 and a portion of associated perpendicular magnetic storage medium 16. Magnetic writer 32 includes write pole 36 and return pole 38 coupled by yoke 40. Coil 42 comprising conductors 44 and 46, encircles yoke 40 and is supported by insulator 48. Perpendicular magnetic storage medium 16 comprises magnetically hard storage layer 50 and soft magnetic underlayer 52. A current in write coil 42 induces a magnetic field in yoke 40 and write pole 36. The polarity of the magnetic field will depend on the direction of current flow through write coil 42. Magnetic flux exits the write pole tip of write pole 36 at air bearing surface (ABS) 56, passes through magnetically hard layer 50 into soft magnetic underlayer 52 of storage medium 16. The magnetic flux returns from storage medium 16 to return pole 38. Near field transducer 58 is coupled to waveguide 60 that receives an electromagnetic wave from an external source such as a laser. Near field radiation at the end of near field transducer 58 is used to heat a portion 62 of magnetically hard layer 50 to lower the coercivity so that the magnetic field from write pole 36 can affect the magnetization of the storage medium.

Figure 3:
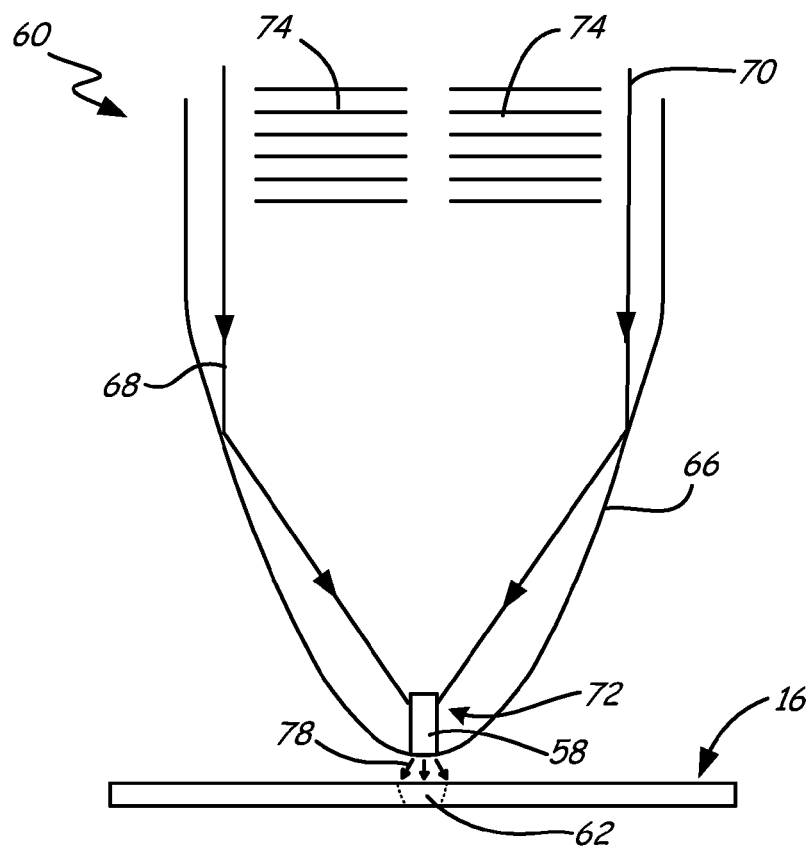
FIG. 3 is a schematic representation of a waveguide and a near field transducer proximate an associated recording medium.

HAMR devices can incorporate various waveguides such as mode index lenses or planar solid immersion mirrors or lenses to generate focused beams. In the example shown in FIG. 3, edge 66 of waveguide 60 is substantially parabolic in shape. If edge 66 is reflective, waveguide 60 acts as a solid immersion mirror. Electromagnetic waves 68 and 70 traveling along the longitudinal axis of waveguide 60 will be reflected at boundary 66 toward focal point 72 as shown. Diffraction gratings 74 or other means known in the art can be used to couple external energy into waveguide 60.

The dimensions of the spot concentrated at focal point 72 of waveguide 60 are diffraction limited and are not sufficient for the sub-100 nm dimensions required for high areal density HAMR recording media. Near field transducers (NFTs) such as metallic pins, sphere/pin, or disc/pin combinations are required to focus the energy to acceptable sub-100 nm spot sizes. Near field transducer 58 positioned at focal point 72 of waveguide 60 can couple with incident waves 68 and 70 to generate surface plasmons that propagate axially down NFT 58 until they exit as evanescent energy schematically shown as arrows 78 that heat a small region 62 of recording media 16.

The waveguide 60 can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, and is transparent throughout the near infrared and visible portions of the spectrum. Waveguide 60 also contains dielectric cladding layers on either side of the core.

One type of NFT comprises two and three dimensional metallic shapes in the form of pins, disc/pin, sphere/pin, as well as "C" shape, "L" shape, and "bowtie" shape apertures in metallic films. These structures resonate when irradiated with properly designed incident electromagnetic radiation, whereby the resulting surface plasmons generated can illuminate minute areas of proximate surfaces with intense radiation. Generally, the structures are metallic shapes in an insulating environment. Planar NFTs are shaped metallic films with or without apertures depending on the orientation of the transducer with respect to the incident radiation.

Another type of NFT includes reverse near field transducers which comprise dielectric shapes in a metal matrix. When a reverse NFT is irradiated with the proper electromagnetic energy, surface plasmons are generated at the metal/dielectric interface at the boundaries of the structure.

Figure 4A:
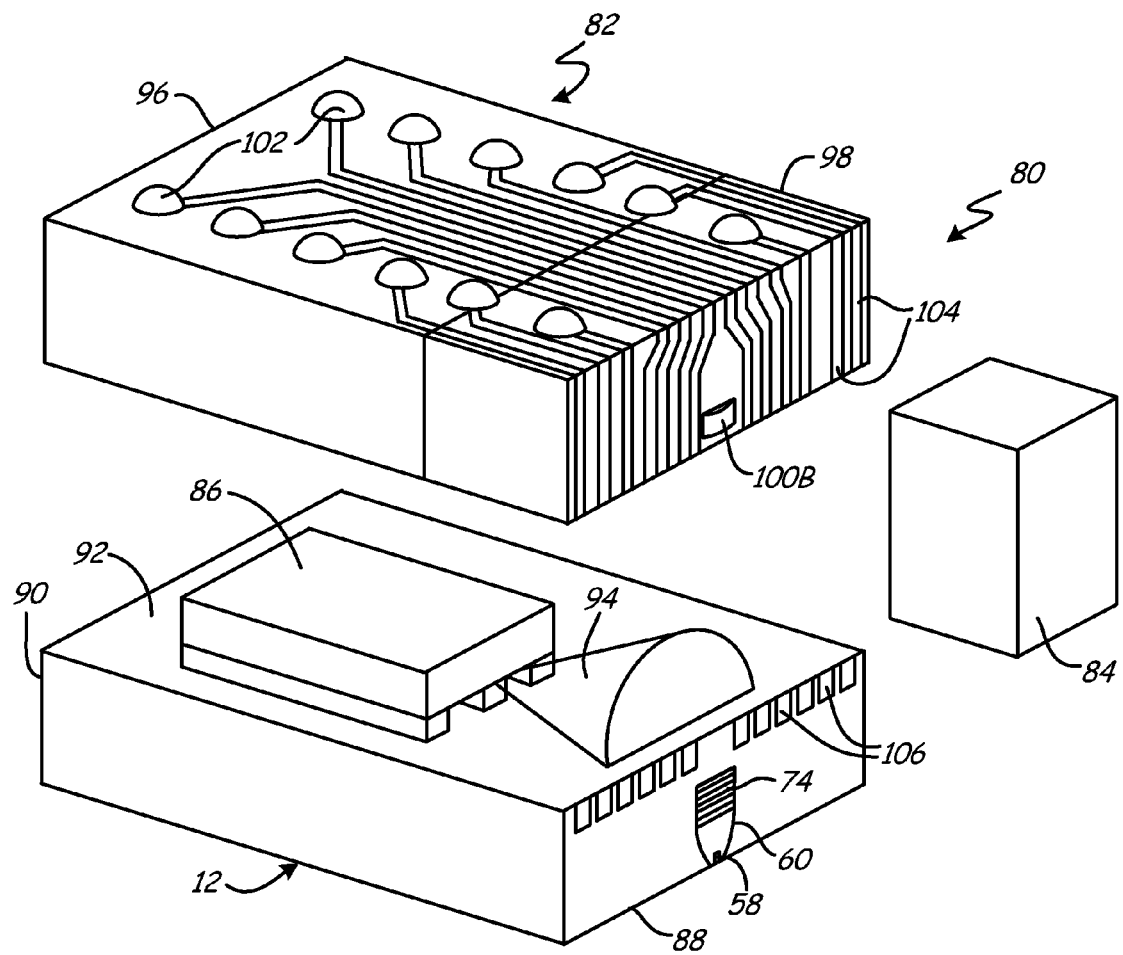
FIG. 4A is an exploded view of a HAMR recording device.
Figure 4B:
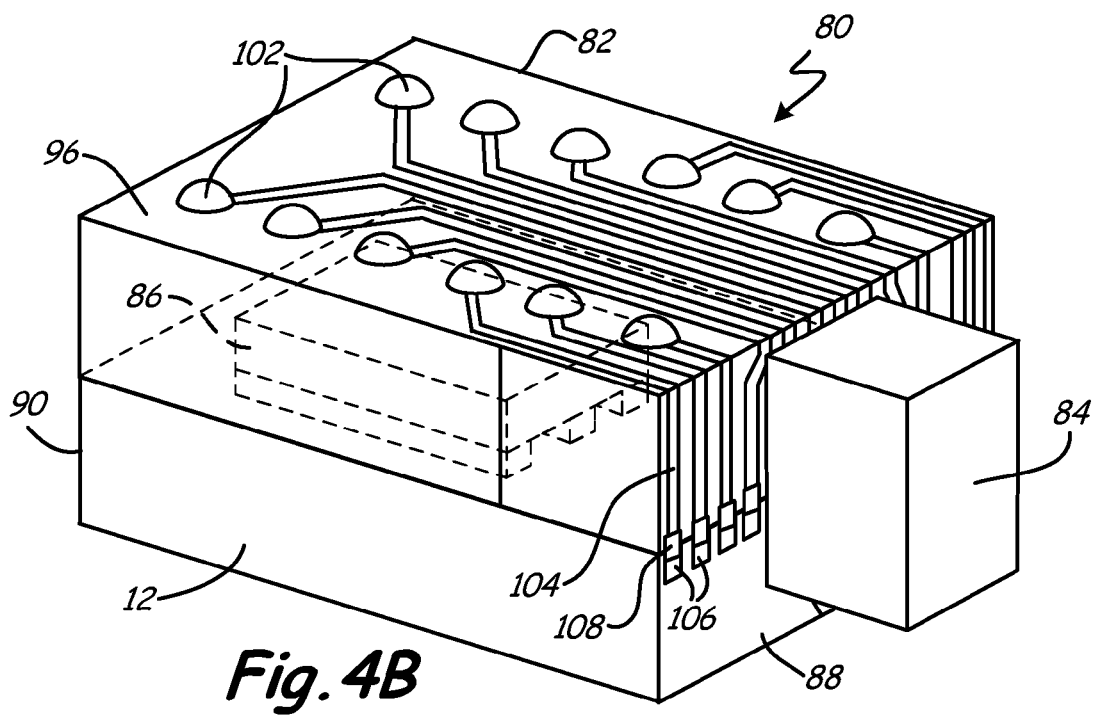
FIG. 4B is a perspective view of a HAMR recording device completely assembled.

FIGS. 4A and 4B show integrated HAMR device 80. FIG. 4A is an exploded view of integrated HAMR device 80 that shows four main parts or components: slider 12, cover 82, mirror 84, and laser 86. Slider 12 has trailing edge 88 and leading edge 90. Leading edge 90 faces toward head mounting block 26, and trailing edge 88 faces away from head mounting block 26. Slider 12 flies above storage medium 16 on an air bearing surface. Slider 12 includes top surface 92 upon which laser 86 is mounted. Laser 86 (or other source of electromagnetic radiation) projects unshaped light beam 94 in a direction towards trailing edge 88. This unshaped light beam 94 needs to be either collimated or focused before it can couple into a transducer and heat storage medium 16. Cover 82 acts as a beam shaper and accomplishes the collimation or focusing when it is placed on slider 12; cover 82 also protects laser 86 when it is placed on slider 12. Cover 82 is made up of cap piece 96 and lens piece 98. Cap piece 96 is preferably made of glass or another suitable substance such as silicon, while lens piece 98 is typically made of glass, and includes collimating or focusing lenses 100A (shown in FIGS. 7 and 9) and 100B. Cap piece 96 and lens piece 98 are bonded together to make cover 82. Many types of bonding are suitable such as anodic and fusion bonding. Cover 82 is also bonded to slider 12 with suitable methods such as solder bonding or an adhesive bond. When cover 82 is bonded to slider 12, a hermetic seal may be created around laser 86 and collimating or focusing lenses 100A and 100B line up with unshaped light beam 94 and collimate or focus it. Mirror 84 is typically made out of silicon, and it is affixed to trailing edge of slider 12 and cover 82. The purpose of mirror 84 is to help direct the shaped light beam into waveguide 60. Its structure and function are explained in more detail below as well as seen more clearly in FIG. 9.

Figure 4C:
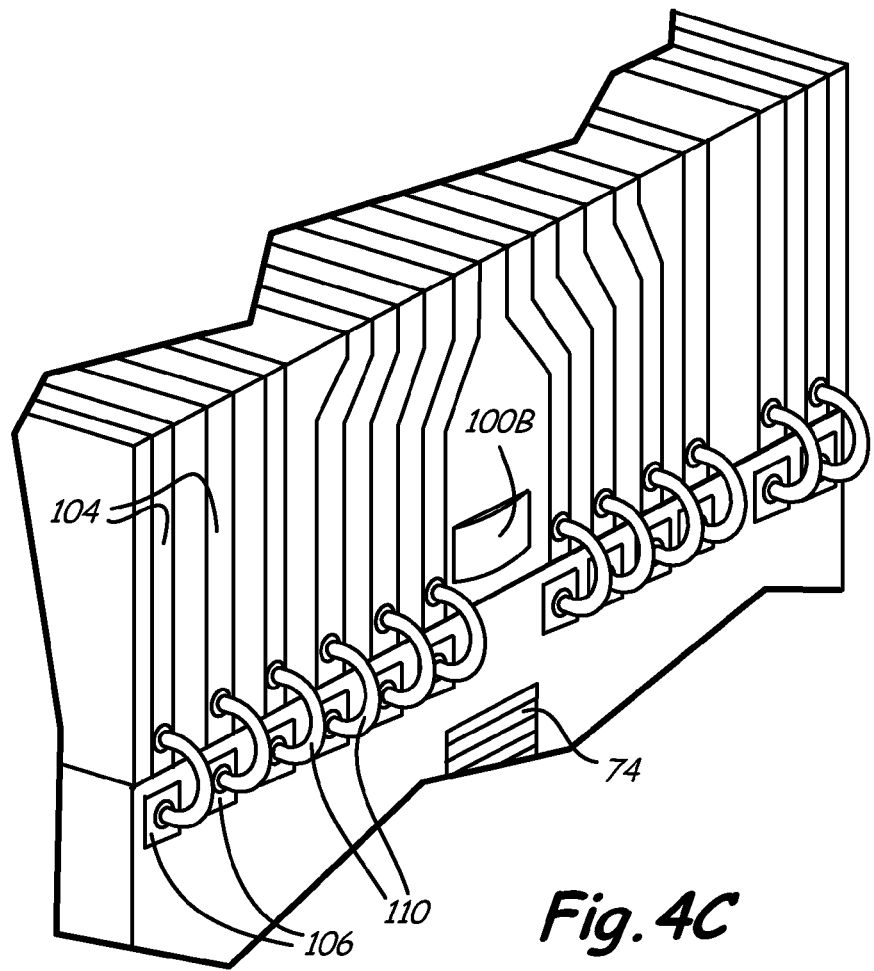
FIG. 4C is a close-up view of wire-bonded interconnects between a slider and cover.

In FIG. 4B, integrated HAMR device 80 is shown in an assembled state. Cover 82 has plurality of ball pads 102 connected to plurality of electrical leads 104 which connect to plurality of contact terminals 106 on slider 12 through plurality of interconnects 108. Interconnects 108 provide electrical communication between electrical leads 104 and contact terminals 106, and therefore provide electrical communication between cover 82 and slider 12. Two preferred embodiments of interconnects 108 are soldered connections and wire-bonded connections, but any other suitable electrical interconnects may be used, including inter-wafer bond connections. Soldered connections are shown in FIG. 4B as well as all other FIGS., except for FIG. 4C which shows wire-bonded connections 110. A flex circuit (not shown) is typically used to connect to plurality of ball pads 102 in order to control the various components of integrated HAMR device 80. Electrical power leads connected to electrical leads 104 and/or contact terminals 106 are laid out on slider 12 leading to laser 86 in order to power and control it. A more detailed explanation is given below in the discussion of FIG. 6.

Figure 5:
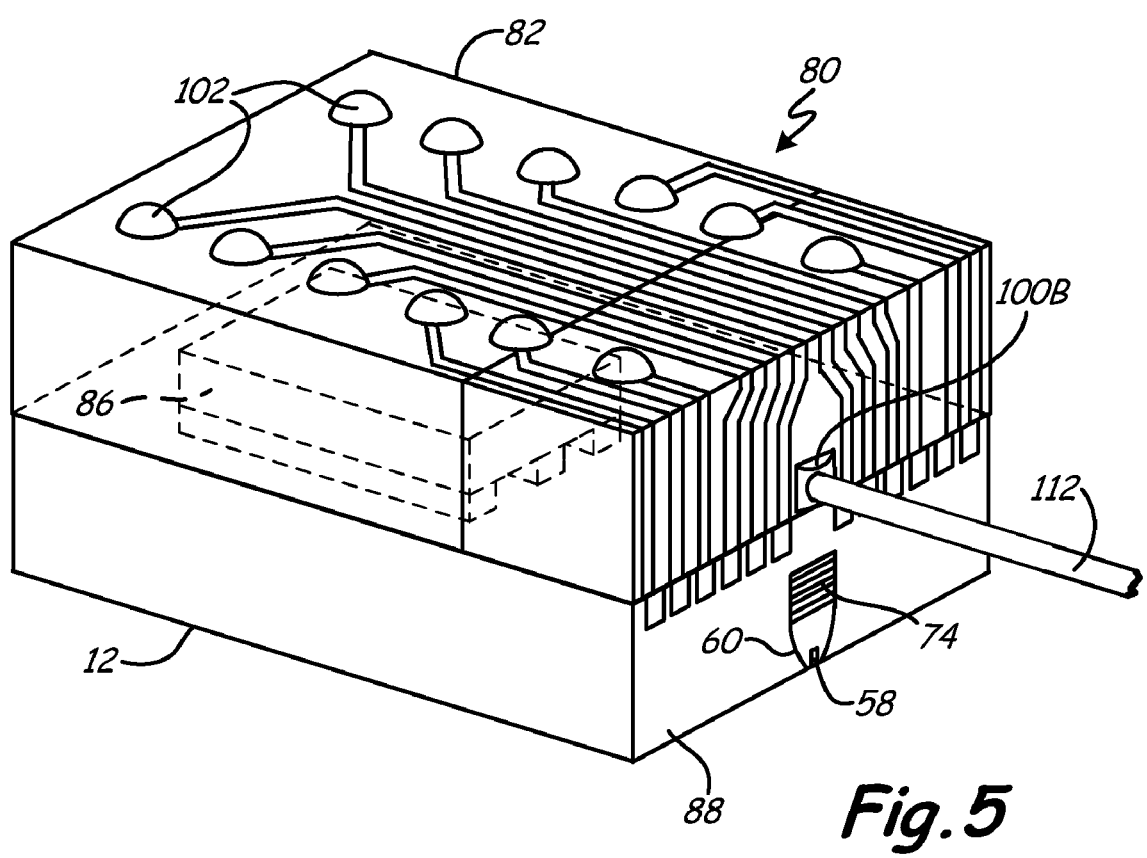
FIG. 5 is a perspective view of the integrated HAMR device without a mirror.

FIG. 5 shows integrated HAMR device 80 with mirror 84 removed. Laser 86 is mounted on slider 12 and is completely enclosed within cover 82. Laser 86 projects a light beam in a direction towards trailing edge 88, and when cover 82 is placed on slider 12 the light beam passes through collimating or focusing lenses 100A and 100B contained within lens piece 98 to become shaped light beam 112. Waveguide 60 is mounted on trailing edge 88 of slider 12. Waveguide 60 may be a planar solid immersion mirror waveguide with coupling grating 74, and is usually parabolic in shape. Other types of waveguides such as three-dimensional solid immersion mirrors or three-dimensional solid immersion lenses may also be used. A light beam must be collimated or focused before it can hit coupling grating 74 and couple into waveguide 60 effectively. When collimated or focused light hits coupling grating 74, it propagates through waveguide 60 and condenses towards the focal point where near field transducer 58 is located. A view of the complete path that a light beam takes can be seen more clearly in FIG. 9.

Figure 6:
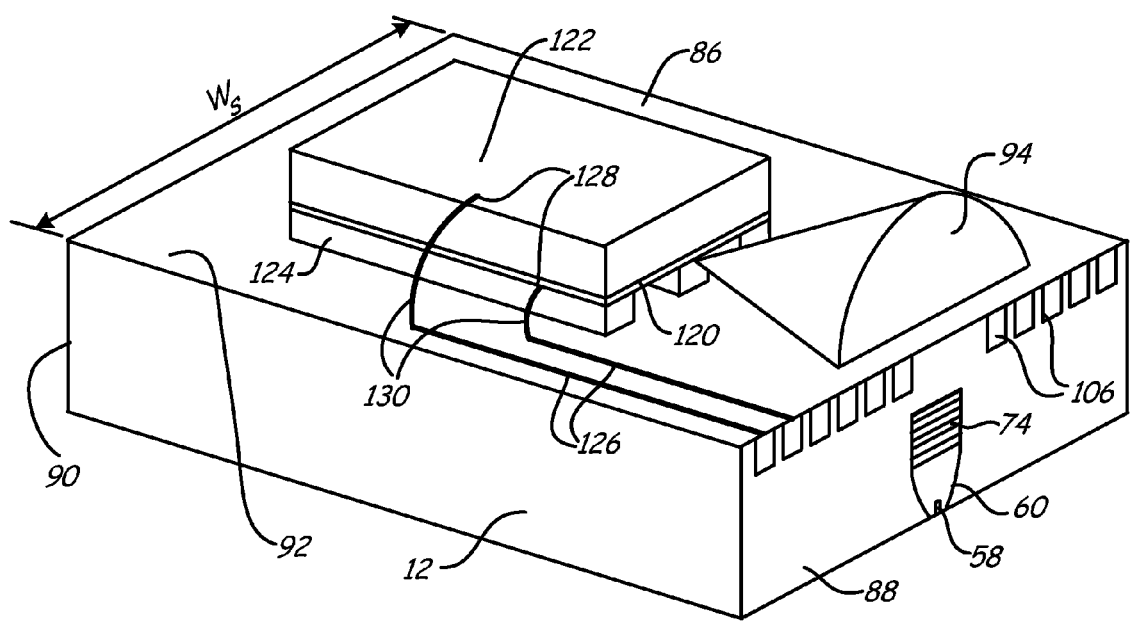
FIG. 6 is a perspective view of a slider and a laser shown in FIGS. 4A-4C and 5.

In FIG. 6, cover 82 has been removed from integrated HAMR device 80 for a clearer view of slider 12 and laser 86. The slider 12 includes top surface 92 upon which laser 86 is mounted. Laser 86 projects unshaped light beam 94 in a direction towards trailing edge 88. Laser 86 may be, for example, a GaAs-type diode laser with P-type region 120 and N-type region 122. P-type region 120 is typically much thinner relative to N-type region 122 even to the point where P-type region 120 constitutes a thin layer on an N-type substrate. Therefore, although unshaped light beam 94 is emitted from the junction of P-type region 120 and N-type region 122, beam 94 will effectively be emitted from whichever side of laser 86 P-type region 120 is on. Accordingly, laser 86 can either be mounted with P-type region 120 adjacent to top surface 92 (P-side down) or P-type region 120 away from top surface 92 (P-side up). If laser 86 is mounted with P-side up, then unshaped light beam 94 will be lined up with collimating or focusing lenses 100A and 100B when cover 82 is bonded to slider 12. If, however, laser 86 is mounted with P-side down, then laser 86 needs to be elevated above top surface 92 to line up unshaped light beam 94 with collimating or focusing lenses 100A and 100B. The elevation is attained with pedestal 124. Mounting laser 86 with P-side down and using pedestal 124 allows for better heat transfer from laser 86 to the ultimate destination, data storage medium 16. In this embodiment, pedestal 124 is made of three parts, but it can be monolithic or otherwise comprise any number of parts. Pedestal 124 is preferably made from a material that matches or is very similar to the thermal expansion coefficient of the laser material (one example of the laser material is GaAs). Some examples of suitable materials for pedestal 124 are BeO, copper, or diamond chips. Mounted on trailing edge 88 of slider 12 are contact terminals 106 and waveguide 60 (with grating 74). A number of contact terminals 106 are connected to electrical power leads 126 that are laid out on top surface 92 of slider 12. Electrical power leads 126 are connected to laser power contacts 128 by power connections 130. Power connections 130 can be wire-bonded connections or any other suitable types of connections.

Figure 7:
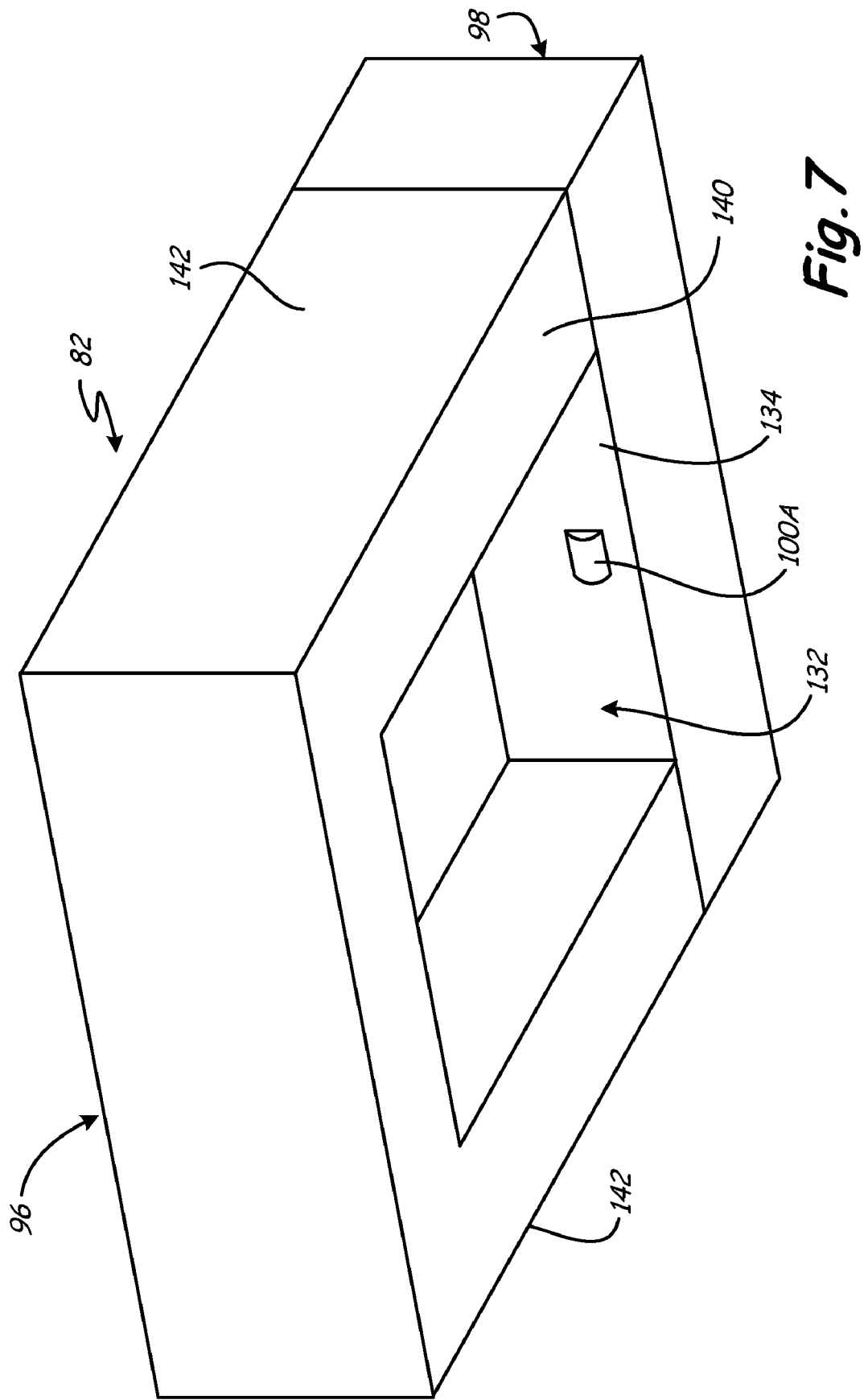
FIG. 7 is a perspective view of a cover shown in FIGS. 4A-4C and 5.
Figure 8:
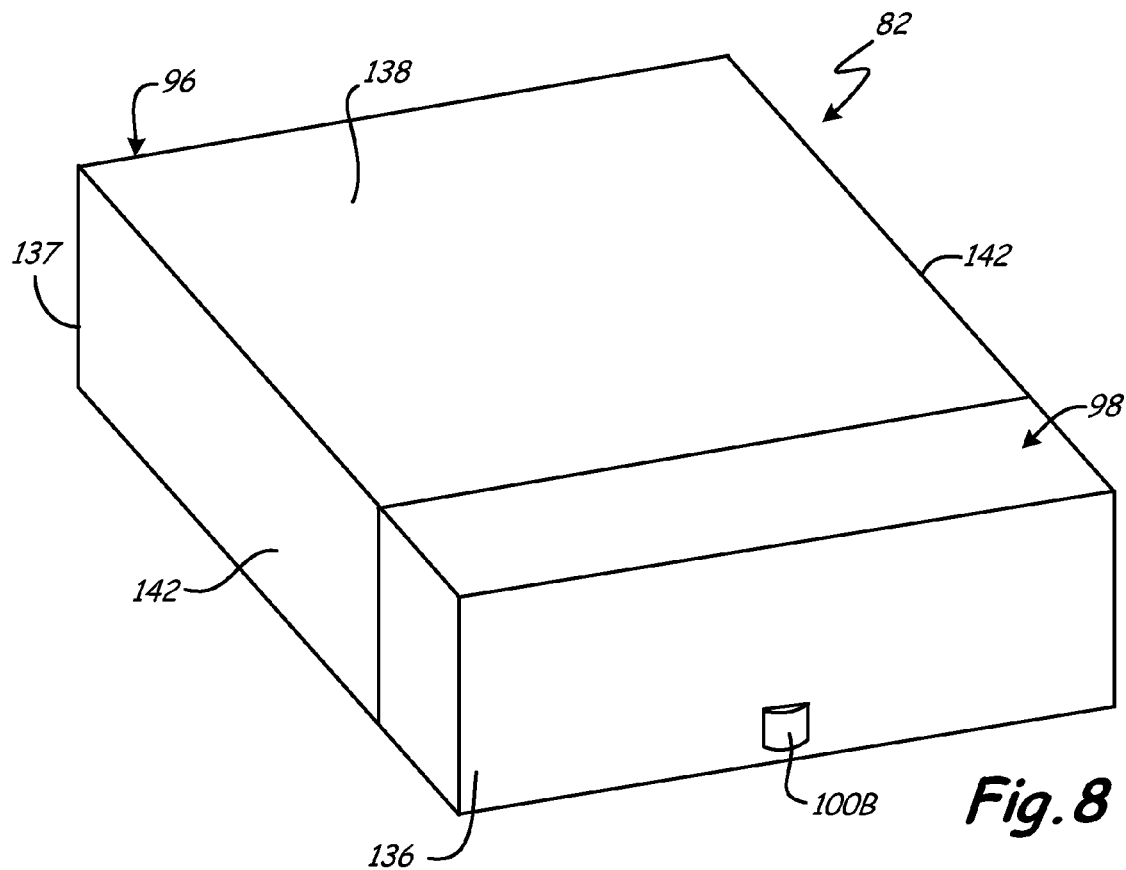
FIG. 8 is another perspective view of a cover shown in FIGS. 4A-4C and 5.

In FIGS. 7 and 8, cover 82 for integrated HAMR device 80 is shown in different perspectives. Cover 82 includes cap piece 96 and lens piece 98, each of which is preferably formed from a wafer. Cap piece 96 and lens piece 98 are bonded together. Many types of bonding are suitable, such as anodic and fusion bonding. Cavity 132 is created by the bonding of cap piece 96 and lens piece 98. Cavity 132 is spacious enough to fit around laser 86. Lens piece 98 includes inner lens surface 134 and outer lens surface 136. Either one or both of these surfaces may have individual lenses on them to either collimate or focus a light beam. In other words, cover 82 may include two surface cross-cylindrical collimating lenses 100A and 100B as shown, or may be a single surface collimating lens. Cover 82 can also include two surface focusing lenses or a single surface focusing lens. FIGS. 5 and 6 show that cylindrical lens 100A (FIG. 5), located on inner lens surface 134, has its axis oriented 90° to the axis of cylindrical lens 100B (FIG. 6), which is located on outer lens surface 136. Therefore, this embodiment employs a cross-cylindrical arrangement. As a result, when cover 82 is placed on slider 12 and over laser 86, the unshaped light beam emitted from laser 86 is collimated and ready to be coupled into a grating 74 and waveguide 60.

Lens piece 98 is ground and polished to a thickness of about 150 μm to 200 μm in between the inner lens surface 134 and the outer lens surface 136. For example, a thickness of about 174 μm may be used. Outer lens surface 136 is located at the trailing end of cover 82 and front surface 137 is located at the leading end. Cover 82 also includes top surface 138, bottom surface 140, and two side surfaces 142. Cover 82 is fashioned to fit on slider 12, and the length of cover 82 from its trailing end to its leading end may be, for example, about 1170 μm to about 1250 μm. The height of the cover 82 from top surface 138 to bottom surface 140 may be, for example, about 225 μm to about 275 μm. The width of the cover 82 in between side surfaces 142 may be, for example, about 790 μm to about 850 μm.

Slider 12 may have similar length and width dimensions to cover 82. This will be the case, for example, when a fabrication process such as the one described in FIGS. 10A-10I is used.

Generally, laser 86 is about one-third the size of both cover 82 and slider 12. However, laser 86 can be any size that can be mounted on top surface 92 of slider 12 and fits inside cavity 132 of cover 82.

Figure 9:
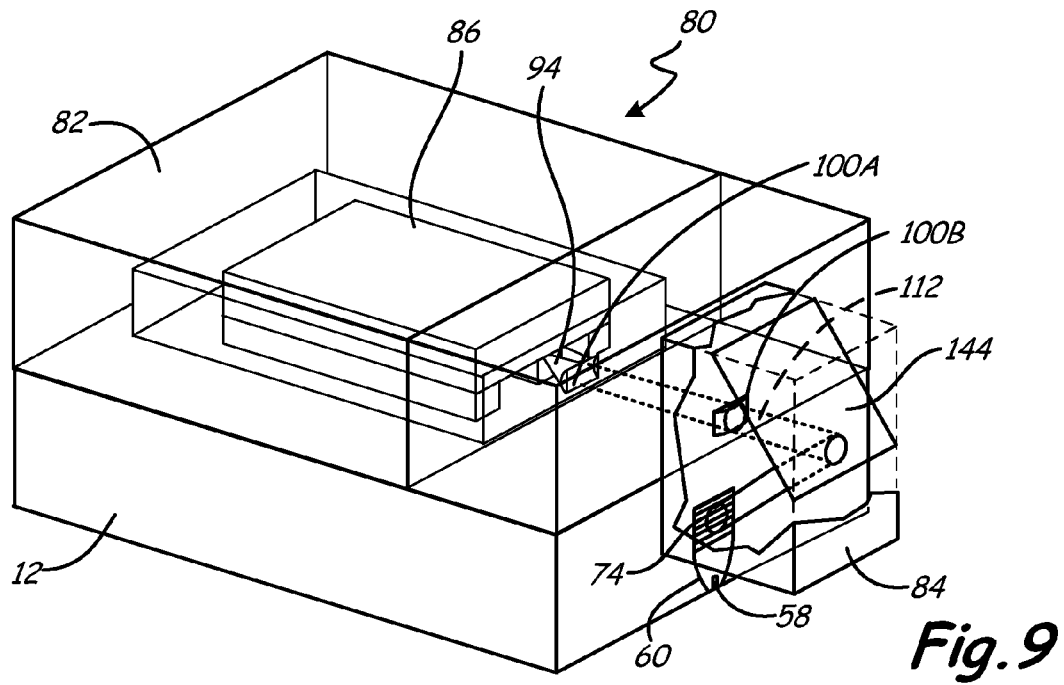
FIG. 9 is a perspective view showing internal components of the integrated HAMR device.

FIG. 9 illustrates the internal path that unshaped light beam 94 and shaped light beam 112 take within integrated HAMR device 80. In this view, a portion of mirror 84 is broken away. Mirror 84, which may be made of silicon, has angled surface 144 created by silicon etching. Angled surface 144 has a mirror finish typically produced by etching and is able to reflect collimated light beam 112 at a given angle. Alternatively, mirror 84 may be made of a transparent material such as glass, with reflective surface 144 produced by polishing. Surface 144 may have a reflective coating such as a metal deposited on it. In this embodiment, unshaped light beam 94 is emitted from laser 86 and goes through a cross-cylindrical collimating lens which is made up of first collimating lens 100A and a second collimating lens 100B. Unshaped light beam 94 is thus transformed into shaped light beam 112 as it enters mirror 84. Angled surface 144 reflects or directs shaped light beam 112 onto coupling grating 74 and into waveguide 60. Mirror 84 can be aligned such that the angle at which shaped light beam 112 hits coupling grating 74 and enters into waveguide 60 creates the optimal energy heat transfer to near field transducer 58 to heat a localized spot on magnetic storage medium 16. If this alignment is done while the output of the electromagnetic radiation is monitored, it is called an "active" alignment.

Figure 10A:
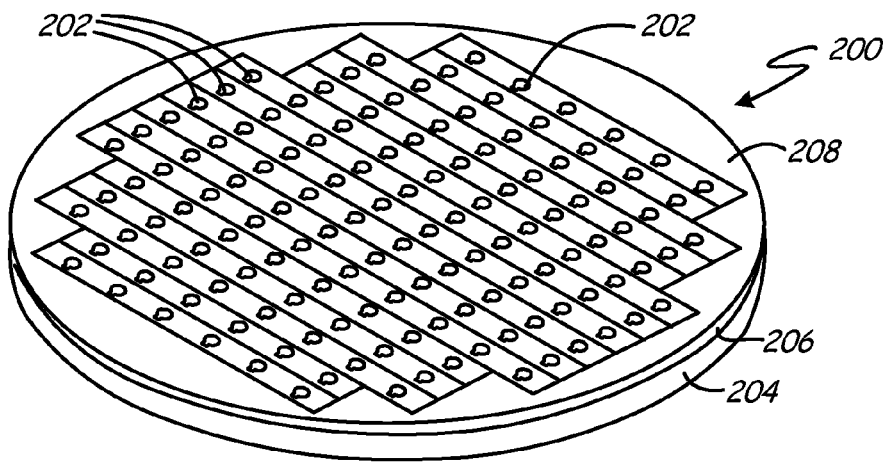
FIGS. 10A-10I are a progressive view of the creation of a plurality of integrated HAMR devices.
Figure 10B:
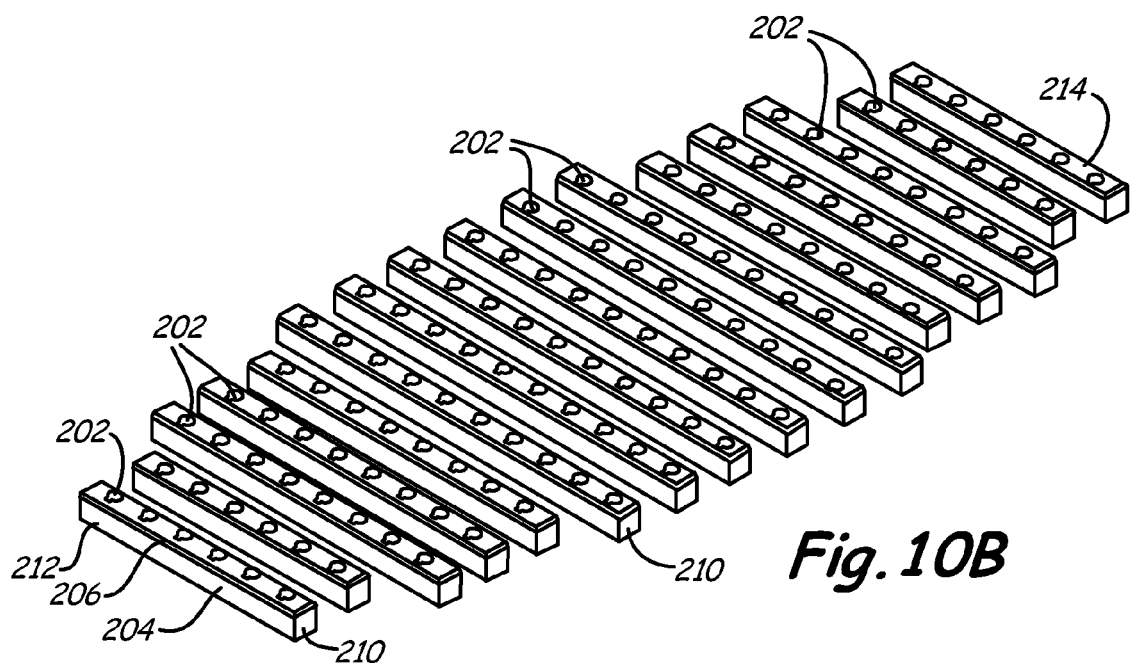
Figure 10C:
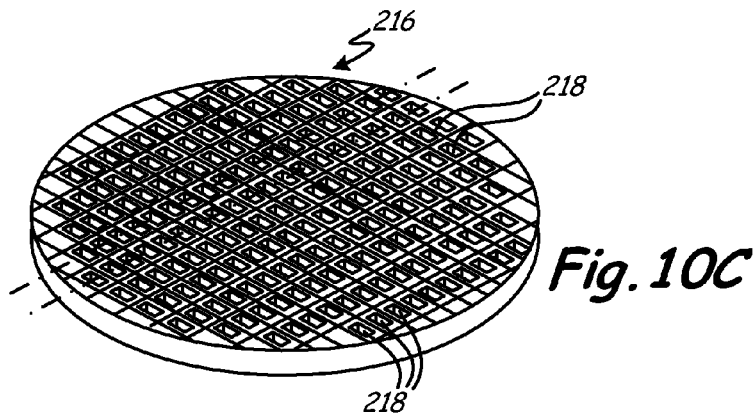
Figure 10D:
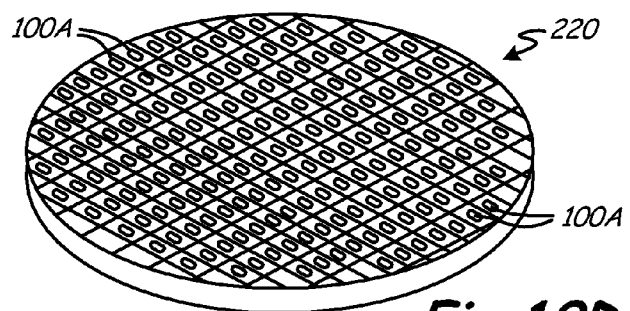
Figure 10E:
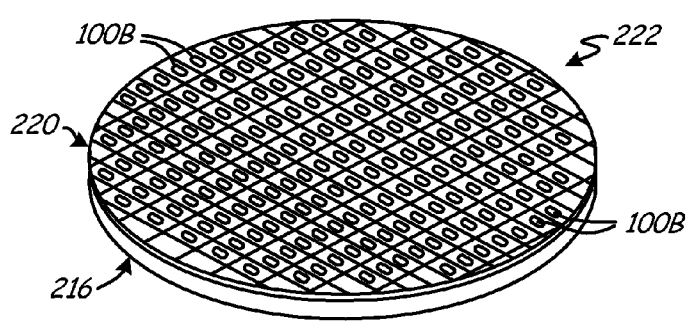
Figure 10F:
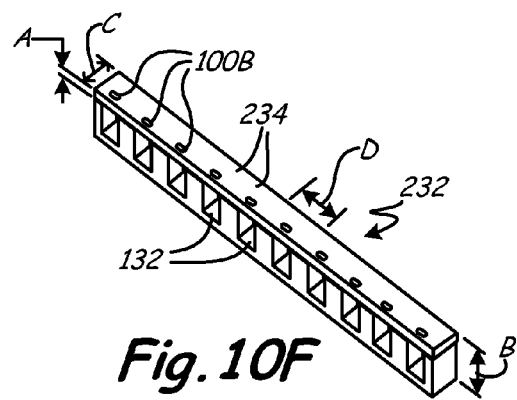
Figure 10G:
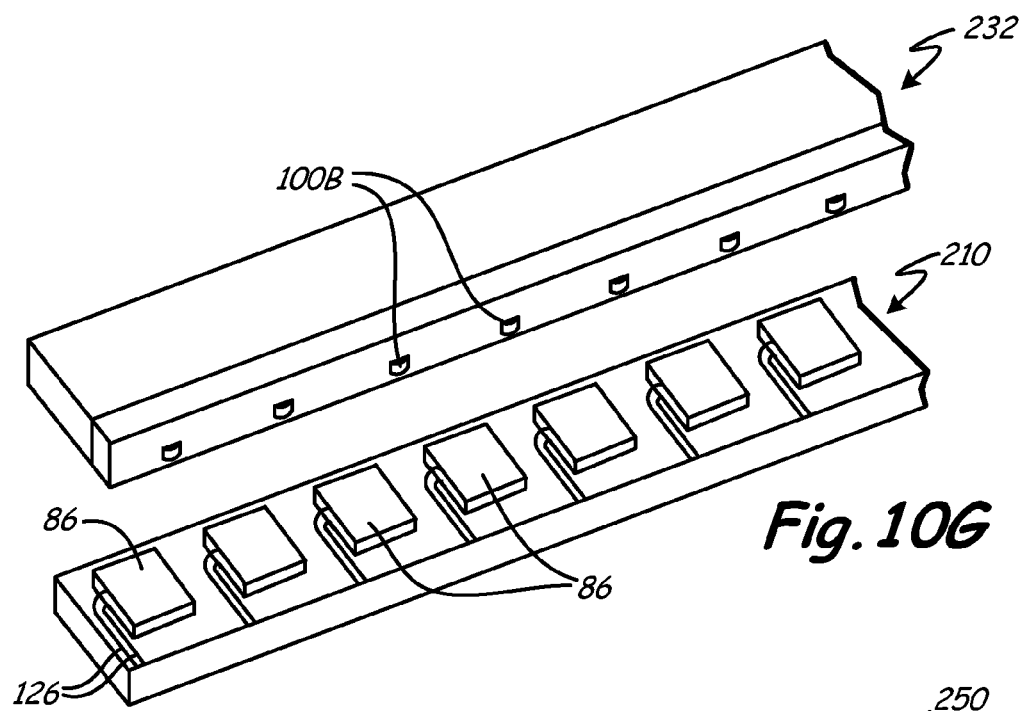
Figure 10H:
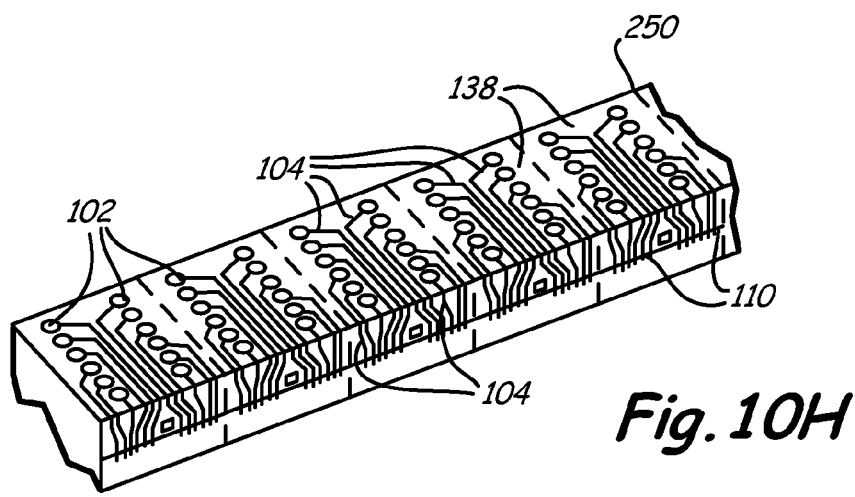
Figure 10I:
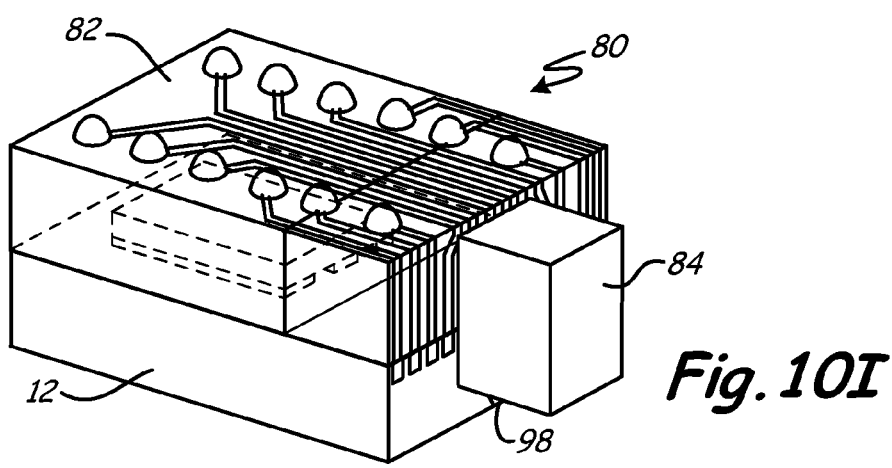

The conventional method of manufacturing sliders uses wafers that comprise a laminate disposed on a substrate and includes a thin-film magnetic head integrated into the wafers. The substrate is typically made from such materials as aluminum oxide and titanium carbide. Generally, a disc shaped wafer is formed from the slider materials and long rows or bars are cut out of the wafer for further processing. FIGS. 10A through 10C show a typical process by which these rows of sliders are made. FIGS. 10D through 10F show a similar type of process by which rows of covers can be made, and FIGS. 10G through 10I show the process by which multiple integrated HAMR devices can be made with the rows of sliders, the rows of covers, lasers, and mirrors.

In FIG. 10A, slider wafer 200 is shown, comprising substrate 204 with laminate 206 and coating layer 208 stacked on substrate 204 by a known technique. As shown, laminate 206 is formed such that a number of thin-film magnetic recording heads 202 are arranged in a matrix on laminate 206.

Next, in FIG. 10B, slider wafer 200 is cut into predetermined sizes and forms, usually into slider bars 210 comprising a plurality of magnetic recording heads 202 arranged in a row and exposed at side face 212. Side faces 212 can then be subjected to a lapping or grinding step so as to form an air bearing surface. Alternatively, this lapping step can be saved until after a few more steps are performed, as discussed below. Moreover, opposite faces 214 running parallel to side faces 212 (not visible from the perspective in FIG. 10B) become the top surfaces of the slider where the lasers are placed pursuant to this invention.

In FIG. 10C, cap wafer 216 is similarly made of a suitable substance such as glass or silicon and includes grid of cavities 218.

As seen in FIG. 10D, lens wafer 220 is also fashioned, usually out of glass. The lens wafer includes a similar grid of inner lenses 100A that match up with cavities 218 of cap wafer 216.

In FIG. 10E, lens wafer 220 is flipped completely over from its orientation shown in FIG. 10D, so that inner lenses 100A are faced toward cap wafer 216 and its grid of cavities 218, and the two wafers 216 and 220 are bonded together, creating lens/cap wafer 222 shown in FIG. 10E. Anodic and fusion bonding, among others, are considered suitable types of bonding for this step. Lens wafer 220 (as part of lens/cap wafer 222) may then be ground and polished to a thickness of about 150 μm to 200 μm (as indicated by line A in FIG. 10F). After lens wafer 220 is ground and polished, outer lenses 100B may be formed on lens wafer 220.

Next, lens/cap wafer 222 is cut into rows. FIG. 10F shows row 232 of covers that include cavities 132 because they are cut as such along the dotted lines shown in FIG. 10C. Row 232 of covers is ready to be cut into plurality of individual covers 234. The total length of individual covers 234 (i.e. the thickness of lens wafer 220 and cap wafer 216 together and as indicated by line B in FIG. 10F) may be about 1170 μm to about 1250 μm. The height of individual covers 234 (as indicated by line C in FIG. 10F) may be about 225 μm to about 275 μm. The width of individual covers 234 (as indicated by line D in FIG. 10F) may be about 790 μm to about 850 μm.

In FIG. 10G, slider bar 210 has electrical connections 126 deposited on it for the lasers 86. Then, lasers 86 are mounted to slider bar 210, and cover row 232 is aligned to fit over slider bar 210, ready for bonding by suitable methods such as solder bonding or an adhesive bond. When cover row 232 is bonded to slider bar 210, hermetic seals may be created around lasers 86. This alignment may be a passive alignment, or it may be an active alignment for lasers 86 located at the opposite ends of slider bar 210. Again, if this alignment is done while the output of the electromagnetic radiation from lasers 86 is monitored, it is called an "active" alignment. Otherwise, it is a passive alignment.

In FIG. 10H, cover row 232 is bonded to slider bar 210, and electrical leads 104 are formed on the trailing end of cover row 232. Next, electrical leads 104 and ball pads 102 are patterned on plurality of cover top surfaces 138, and interconnects 110 are made between slider bar 210 and cover row 232. Interconnects 110 may be, for example, soldered connections or wire-bonded connections, but any suitable electrical interconnect can be used, including inter-wafer bond connections. Finally, the combined slider bar 210 and cover row 232 can be diced into individual parts along dashed lines 250 shown in FIG. 10H.

At this point, the individual parts are slider 12 and cover 82 bonded together. Integrated HAMR device 80 is complete except for the mounting of mirror 84. The individual devices are then attached to head gimbal assemblies. Mirror 84 can be actively or passively aligned as shown in FIG. 10I to create individual integrated HAMR device 80. Again, an active alignment entails monitoring the output of the electromagnetic radiation from waveguide end 118 while mirror 84 is being adjusted. A passive alignment relies on the geometry of the structure and the tolerances of the parts to affix mirror 84 in a correct spot.

Although the present invention has been described with reference to preferred embodiments, workers skilled in the art will recognize that changes may be made in form and detail without departing from the spirit and scope of the invention.

The invention claimed is:

1. An apparatus comprising:
    a slider having a top surface, a bottom surface, and a trailing end;
    a waveguide on the trailing end of the slider;
    a near field transducer positioned to receive energy from the waveguide and producing plasmons for heating a region of a magnetic medium;
    a write pole carried by the slider adjacent to the near field transducer;
    a solid state laser mounted on the top surface of the slider and configured to produce a laser beam;
    a cover mounted on the top surface of the slider that encloses the laser and that optically couples the laser to the slider, the cover comprising a beam shaper configured to collimate or focus the laser beam; and
    a mirror mounted on the slider and configured to direct the collimated or focused light beam into the waveguide.

2. The apparatus of claim 1, wherein the beam shaper comprises:
    a lens.

3. The apparatus of claim 1, wherein the cover comprises surface mounted pads configured to electrically couple the cover to a disc drive, the apparatus further comprising a plurality of soldered electrical connections that electrically couple the slider to the cover.

4. The apparatus of claim 1, wherein the cover comprises surface mounted pads configured to electrically couple the cover to a disc drive, the apparatus further comprising a plurality of wire-bonded electrical connections that electrically couple the slider to the cover.

5. The apparatus of claim 1, wherein the beam shaper includes a collimating or focusing lens carried at a trailing end of the cover.

6. The apparatus of claim 1, wherein electrical leads extend over a top surface of the cover, the electrical leads being configured to couple the slider to a disc drive.

7. The apparatus of claim 1, wherein the cover is bonded to the slider.

8. The apparatus of claim 1, wherein the cover creates a hermetic seal around the laser.

9. The apparatus of claim 1, wherein the waveguide has a coupling grating at an upper end for receiving the collimated or focused laser beam from the mirror.

10. The apparatus of claim 9, wherein the waveguide is configured to direct the collimated or focused laser beam received by the coupling grating onto the near field transducer.

11. An apparatus comprising:
a slider;
a laser affixed to a top surface of the slider for producing a laser beam;
a cover mounted on the top surface of the slider;
a cross-cylindrical collimating lens disposed on an interior surface of the cover and configured to collimate or focus the laser beam into a collimated or focused beam;
a second cross-cylindrical lens disposed on an exterior surface of the cover;
a mirror affixed to a trailing edge of the slider for directing the collimated or focused beam into a waveguide carried by the slider;
a near field transducer for receiving energy from the waveguide to heat a local region on a magnetic medium; and
a write pole carried by the slider adjacent to the near field transducer.

12. The apparatus of claim 11, wherein the cover is bonded to the top surface of the slider and creates a hermetic seal around the laser.

13. The apparatus of claim 11, wherein the lens is carried by the cover.

14. The apparatus of claim 11, wherein the lens is disposed on an interior surface of the cover.

15. The apparatus of claim 11, wherein the lens is disposed on an exterior surface of the cover.

16. The apparatus of claim 11, wherein a length of the cover ranges from about 1170 µm to about 1250 µm, a width of the cover ranges from about 790 µm to about 850 µm, and a height of the cover ranges from about 225 µm to about 275 µm.

17. The apparatus of claim 6, further comprising pads on the top surface of the cover, the pads electrically coupling the electrical leads to the disc drive.

* * * * *